United States Patent
Joern et al.

(10) Patent No.: US 10,450,052 B2
(45) Date of Patent: Oct. 22, 2019

(54) SANDWICH STRUCTURE

(71) Applicant: Airbus Operations GmbH, Hamburg (DE)

(72) Inventors: Paul Joern, Hamburg (DE); Karim Grase, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 477 days.

(21) Appl. No.: 15/216,984

(22) Filed: Jul. 22, 2016

(65) Prior Publication Data

US 2017/0021910 A1 Jan. 26, 2017

(30) Foreign Application Priority Data

Jul. 22, 2015 (DE) .......................... 10 2015 111 936

(51) Int. Cl.
*B64C 3/20* (2006.01)
*B64C 1/10* (2006.01)

(52) U.S. Cl.
CPC . *B64C 3/20* (2013.01); *B64C 1/10* (2013.01)

(58) Field of Classification Search
CPC .................................. B32B 7/08; B64C 3/20
See application file for complete search history.

(56) References Cited

U.S. PATENT DOCUMENTS

| | | | | |
|---|---|---|---|---|
| 5,470,649 A | * | 11/1995 | Farley | ................... B29C 70/023 442/238 |
| 5,652,041 A | | 7/1997 | Buerger et al. | |
| 7,669,799 B2 | * | 3/2010 | Elzey | ........................ B32B 3/28 244/123.12 |
| 8,186,262 B2 | * | 5/2012 | Farquhar | .................. B64D 7/00 89/36.01 |
| 9,296,463 B2 | * | 3/2016 | Zuardy | ...................... B64C 3/20 |
| 9,475,261 B2 | * | 10/2016 | Pinney | ...................... B32B 7/08 |

FOREIGN PATENT DOCUMENTS

| | | |
|---|---|---|
| DE | 10 2010 035787 | 3/2012 |
| DE | 10 2013 114253 | 6/2015 |
| WO | WO 2009/007873 | 1/2009 |
| WO | WO 2012/010305 | 1/2012 |

OTHER PUBLICATIONS

German Search Report for Application No. 102015111936 dated Mar. 22, 2016.

* cited by examiner

*Primary Examiner* — Brian M O'Hara
(74) *Attorney, Agent, or Firm* — Jenkins, Wilson, Taylor & Hunt, P.A.

(57) ABSTRACT

A sandwich structure with an outer cover layer, inner cover layer, core layer, and pins extending through the core layer. The sandwich structure has a large core thickness resistant to crack formation and to detachment of the cover layers from the core layer. An anchor layer is between the outer and inner cover layers and divides the core layer, at least in areas, into an outer core layer section and inner core layer section. An outer group of pins extends through the outer core layer section and an inner group of pins extends through the inner core layer section. The outer group pins are connected to the anchor layer with their first end and to the outer cover layer with their opposite second end, and the inner group pins are connected to the anchor layer with their first end and to the inner cover layer with their opposite second end.

5 Claims, 2 Drawing Sheets

SANDWICH STRUCTURE

CROSS-REFERENCE TO RELATED APPLICATION

This application claims priority to German Patent Application No. 10 2015 111 936.6 filed Jul. 22, 2015, the entire disclosure of which is incorporated by reference herein.

TECHNICAL FIELD

The present disclosure relates to a sandwich structure, in particular to a pin-reinforced sandwich structure with a large core thickness, and to an aircraft with such a sandwich structure. The sandwich structure is constructed, in particular, shell-shaped or plate-shaped, wherein it can also have curves or curvatures.

BACKGROUND

The sandwich structure comprises an outer cover layer, an inner cover layer disposed opposite the outer cover layer in a thickness direction, and a core layer which, as viewed in the thickness direction, is disposed between the outer and the inner cover layers and connects them. The designations "outer cover layer" and "inner cover layer" are not in principle meant to restrict the positions of the cover layers to an inner side and an outer side, but can just as well be understood to mean "front cover layer" and "back cover layer" or "first cover layer" and "second cover layer". The sandwich structure furthermore comprises a plurality of pins that extend between the outer cover layer and the inner cover layer, through the core layer. The outer cover layer and the inner cover layer, as well as the pins, are preferably made of a fiber or fibrous composite material, in particular CFRP or GFRP. The core layer is preferably formed from foam material, such as polymethacrylimide (PMI).

Such sandwich structures are known from the prior art, for example from WO 2012/010305 A1. The purpose of the pins therein is to prevent or stop crack formation in the core layer as well as detachment or delamination of the cover layers from the core layer. The pins are usually introduced into the core layer through needles provided for this purpose. For stability reasons and because of friction between the core layer and the needles during the introduction of the pins, the length of the needles, and thus the length of the pins, is limited to about 90 mm. This length limit of about 90 mm is related to a particular density of the material of the core layer and, in the case of a change of this density, it can also deviate considerably from about 90 mm. Because the pins must extend from one cover layer to the opposite cover layer in order to prevent detachment of the cover layers from the core layer, the thickness of the core layer, and of the entire sandwich structure, is likewise limited in this manner to a maximum of about 90 mm due to the limited length of the pins. However, because it may be necessary or advantageous to provide core thicknesses considerably greater than about 90 mm for various applications of the sandwich structure (such as, for example, in airplane construction) in which applications high shear forces must be transmitted, at present it is not readily possible to also reinforce such sandwich structures with large thicknesses with pins. In other words, it is either impossible or else extremely difficult to manufacture pin-reinforced sandwich structures that also have large core thicknesses.

SUMMARY

Thus, an object of the present disclosure is to provide a sandwich structure with a large core thickness that is particularly resistant to crack formation in the core layer as well as to detachment of the cover layers from the core layer.

This object is achieved in that an anchor layer is provided between the outer and the inner cover layers. The anchor layer extends transversely, preferably perpendicularly, to the thickness direction and divides the core layer, at least in areas, into an outer core layer section or portion in abutment with the outer cover layer and into an inner core layer section or portion in abutment with the inner cover layer. This means that the outer core layer section is situated between the anchor layer and the outer cover layer, and that the inner core layer section is situated between the anchor layer and the inner cover layer. In this regard, the anchor layer can extend, in a plane perpendicular to the thickness direction, either through the entire sandwich structure or just through an area of the sandwich structure. Furthermore, an outer group of pins extends through the outer core layer section and an inner group of pins extends through the inner core layer section. The pins of the outer group are connected to the anchor layer with a first end and to the outer cover layer with an opposite second end. The pins of the inner group are connected to the anchor layer with a first end and to the inner cover layer with an opposite second end. The pins in this case can be connected to the anchor layer and to the cover layers in such a way that they project or extend into these layers or penetrate these layers and are thereby fixed or secured therein.

In this manner, an intermediate layer is formed by the anchor layer between the cover layers, in which intermediate layer the pins can be anchored with their first ends such that they only need to span half of the thickness or a portion of the thickness of the sandwich structure from one of the cover layers to the anchor layer, rather than having to extend across the entire thickness of the sandwich structure from the outer cover layer to the inner cover layer. The core layer is thus divided into an outer and an inner core layer section or portion, each of which can be spanned separately by pins. In this manner, an inner as well as an outer core layer section, each having a thickness of about 90 mm, can be spanned with pins having a length of about 90 mm, thereby making it possible to also reinforce with pins sandwich structures having a core layer which has a thickness of up to about 180 mm. Such sandwich structures can be used, in particular, in the aircraft sector, for example as pressure bulkheads or as wing shells in the area of the wing root. However, they can also be used in other sectors, such as on rotor blades of wind power plants, in trains, or on pressure tanks or containers.

In a preferred embodiment, the outer cover layer, the inner cover layer, the anchor layer, and the pins are formed with each other in monolithic fashion from a fiber or fibrous composite material, in particular from CFRP or GFRP. The cover layers, the anchor layer, and the pins are preferably cured together with each other. In this manner the cover layers, the anchor layer, and the pins jointly form a monolithic framework for the sandwich structure, such that loads can be transferred particularly effectively and crack formation in the core layer as well as detachments or delaminations of the cover layers can be prevented.

In a further preferred embodiment, the anchor layer is monolithically joined on its layer border or edge to the outer cover layer and/or to the inner cover layer. In this manner, the anchor layer is fixed at its layer border or edge and thus stabilized.

In this regard, it is particularly preferred if the sandwich structure comprises a peripheral or edge area at which the cover layers are monolithically joined to one another. At the peripheral area of the sandwich structure, the anchor layer is thus monolithically joined with its layer border or edge to the outer and inner cover layers. At its layer border or edge, the anchor layer is thus clamped between the outer and inner cover layers in the peripheral area of the sandwich structure. The anchor layer is thereby further stabilized. The peripheral area can be provided circumferentially around the entire sandwich structure, or only on one or on individual sides on the sandwich structure.

However, in an alternative embodiment, the layer border or edge can also lie freely in the core layer, without being joined or connected to the outer cover layer or to the inner cover layer. In the case of a diminishing core thickness, for example, a transition between a two-piece core layer with an anchor layer and a one-piece core layer is thus achievable.

According to a further preferred embodiment, the anchor layer comprises an outer anchor layer part, which points to or faces the outer cover layer, and an inner anchor layer part, which points to or faces the inner cover layer and which preferably extends, at least in sections, parallel to the outer anchor layer part. The outer and inner anchor layer parts extend transversely, preferably perpendicularly, to the thickness direction. Between the outer and inner anchor layer parts, the core layer has a middle core layer section through which a middle group of pins extends. The pins of the outer group are connected to the outer anchor layer part with the first end and to the outer cover layer with the opposite second end. The pins of the inner group are connected to the inner anchor layer part with the first end and to the inner cover layer with the opposite second end. The pins of the middle group are connected to the outer anchor layer part with a first end and to the inner anchor layer part with an opposite second end. With such a two-piece construction of the anchor layer and three-piece construction of the core layer, sandwich structures with core thicknesses greater than about 180 mm, namely up to about 270 mm, can also be reinforced with pins. Of course, the anchor layer can also have additional anchor layer parts that subdivide the core layer into additional core layer sections such that even greater core thicknesses can be spanned in this manner.

Another aspect of the present disclosure relates to an aircraft or airplane with a fuselage and a wing. The wing extends between a wing tip pointing or facing away from the fuselage and a wing root opposite the wing tip, with which wing root the wing is secured to the fuselage. In the area of the wing root, the wing comprises a sandwich structure according to one of the previously described embodiments. The wing is preferably formed or constructed as a shell structure with a top or upper shell part and a bottom or lower shell part, wherein the top shell part and/or the bottom shell part comprise(s) a sandwich structure according to one of the previously described embodiments in the area of the wing root. The outer cover layer can form an outer surface of the wing and the inner cover layer can point to or face the inner side of the shell structure or rather of the wing. Particularly in the area of the wing root, the wing, i.e., at least one of the shell parts of the wing, has a particularly large core thickness, so that pins are used in conjunction with an anchor layer for reinforcing the sandwich structure in this area, as was previously described.

In this regard, it is particularly preferred if the spacing or distance between the outer and the inner cover layers decreases from the wing root towards the wing tip, i.e., the core thickness decreases towards the wing tip, because the loads decrease in this direction. Starting from the wing root, the anchor layer extends towards the wing tip, at least as far as a location at which the spacing or distance between the outer and the inner cover layers is between 30 mm and 200 mm, preferably 90 mm, depending on the density of the material of the core layer. From this location on, where the core thickness becomes less than about 90 mm, the pins can be used without an anchor layer because they are able to extend from the outer to the inner core layer. The anchor layer can end in the area of the core layer between the outer and the inner cover layer, without being connected to one of the cover layers. However, the anchor layer can also be secured to one of the cover layers and end there.

BRIEF DESCRIPTION OF THE DRAWINGS

Exemplary embodiments of the present disclosure shall be explained in more detail below, with reference to drawings. The drawing show in.

DETAILED DESCRIPTION

Figure 1:
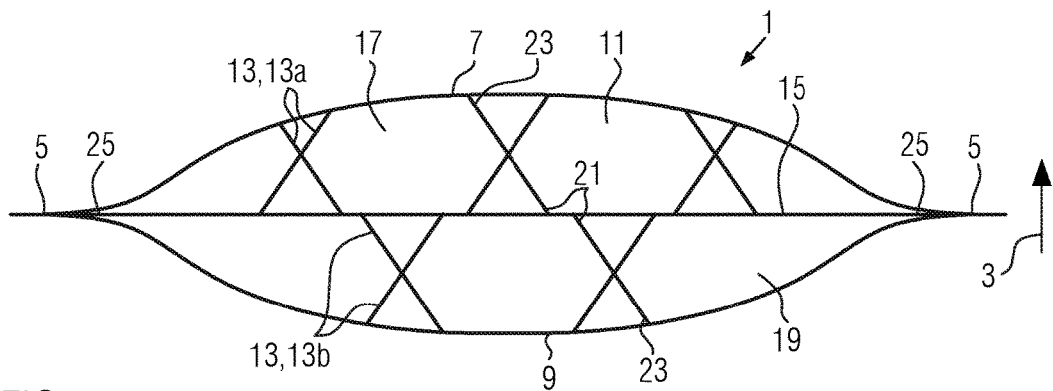
FIG. 1 a cross section of a first exemplary embodiment of the sandwich structure according to the disclosure herein with a one-piece anchor layer.

A first exemplary embodiment of a sandwich structure 1 according to the disclosure herein is illustrated in FIG. 1. The sandwich structure 1 is formed in the shape of a shell or plate, which extends in a plane perpendicular to a thickness direction 3 and comprises a circumferential peripheral or edge area 5. The sandwich structure 1 comprises an outer cover layer 7, an inner cover layer 9 disposed opposite the outer cover layer 7 in the thickness direction 3, and a core layer 11, which, as viewed in the thickness direction 3, is disposed between the outer and inner cover layers 7, 9 and connects them.

The sandwich structure 1 furthermore comprises a plurality of pins 13, which extend between the outer and the inner cover layers 7, 9, through the core layer 11. Further, an anchor layer 15 is provided between the outer and the inner cover layers 7, 9, which anchor layer 15 extends perpendicularly to the thickness direction 3 and divides the core layer 11 into an outer core layer section or portion 17 in abutment with the outer cover layer 7 and an inner core layer section or portion 9 in abutment with the inner cover layer 19. An outer group 13a of pins 13 extends through the outer core layer section 17 and an inner group 13b of pins 13 extends through the inner core layer section 19, wherein the pins 13 of the outer group 13a are fixed in the anchor layer 15 with a first end 21 and in the outer cover layer 7 with an opposite second end 23, and the pins 13 of the inner group 13b are fixed in the anchor layer 15 with the first end 21 and in the inner cover layer 9 with the opposite second end 23.

The outer cover layer 7, the inner cover layer 9, the anchor layer 15, and the pins 13 in the present exemplary embodiment are formed from a fiber composite material, namely CFRP, and cured with each other in monolithic fashion. The anchor layer 15 comprises a layer border or edge 25 at which the anchor layer 15 is monolithically connected to the outer and the inner cover layers 7, 9, wherein in the peripheral or edge area 5 of the sandwich structure 1, the layer border or edge 25 of the anchor layer 15 is disposed between the outer and the inner cover layers 7, 9 and is cured together with them in monolithic fashion. By the anchor layer 15, in which the pins 13 are fixed or secured with their first end 21, the sandwich structure 1 can be configured with a large core thickness without the pins 13 having to have a large length. Such sandwich structures 1 with large core thicknesses can be used, for example, in aircraft or airplane construction, particularly in the pressure bulkhead or in the wing in the area of the wing root, for rotor blades of wind power plants, for pressure tanks or containers, or for vehicles with larger dimensions, such as trains.

Figure 2:
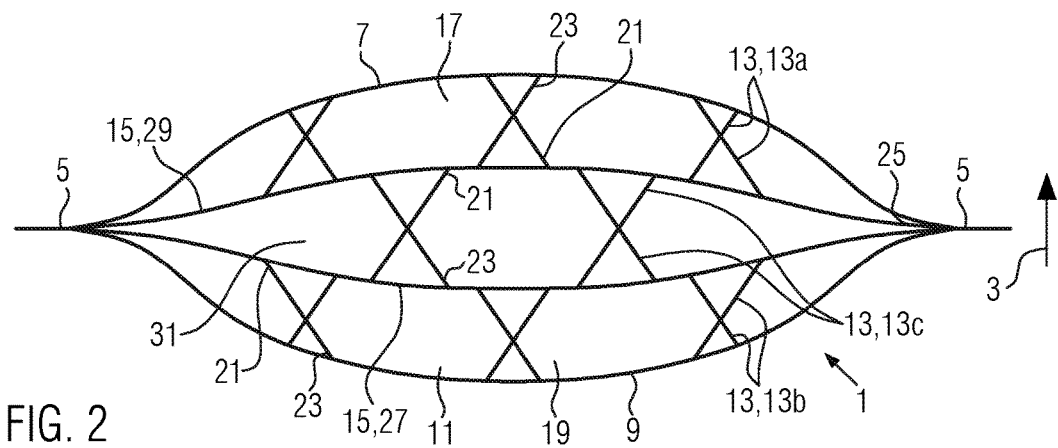
FIG. 2 a cross section of a second exemplary embodiment of the sandwich structure according to the disclosure herein with a two-piece anchor layer.

In FIG. 2 a second exemplary embodiment of the sandwich structure 1 according to the disclosure herein is shown, which resembles the first exemplary embodiment, so that corresponding features are designated with the same reference signs.

The second exemplary embodiment of the sandwich structure 1 differs from the first exemplary embodiment, in that the anchor layer 15 comprises an outer anchor layer part 27 pointing to or facing the outer cover layer 7 and an inner anchor layer part 29 pointing to or facing the inner cover layer 9, wherein the outer and the inner anchor layer parts 27, 29 run or extend transversely to the thickness direction 3. Between the outer and the inner anchor layer parts 27, 29, the core layer 11 has a middle core layer section or portion 31 through which a middle group 13c of pins 31 extends. The anchor layer 15 is thus divided into two anchor layer parts 27, 29 running or extending transversely to the thickness direction 3 and approximately parallel to the cover layers 7, 9, between which parts the middle core layer section 31 is enclosed. The pins 13 of the outer group 13a are fixed in the outer anchor layer part 27 with their first end 21 and in the outer cover layer 7 with their opposite second end 23. The pins 13 of the inner group 13b are fixed in the inner anchor layer part 29 with their first end 21 and in the inner cover layer 9 with their opposite second end 23. The pins 13 of the middle group 13c are fixed in the outer anchor layer part 27 with their first end 21 and in the inner anchor layer part 29 with their opposite second end 23. Even greater core thicknesses of the sandwich structure 1 are achievable with such a two-piece anchor layer 15, without having to lengthen the pins 13.

Figure 3:
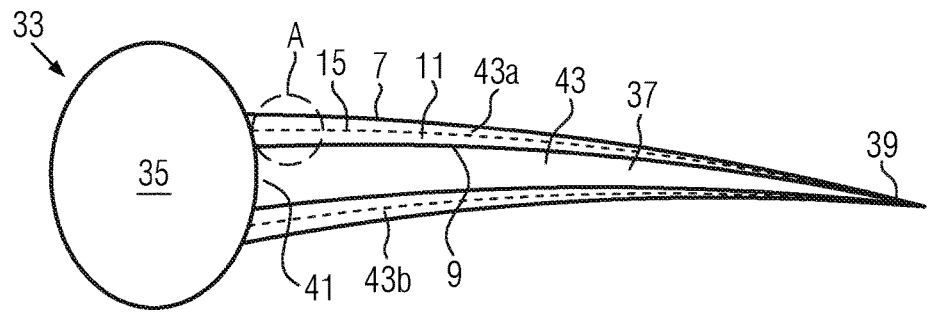
FIG. 3 a diagrammatic cross sectional view of an airplane or aircraft according to the disclosure herein with a sandwich structure according to the disclosure herein.
Figure 4:
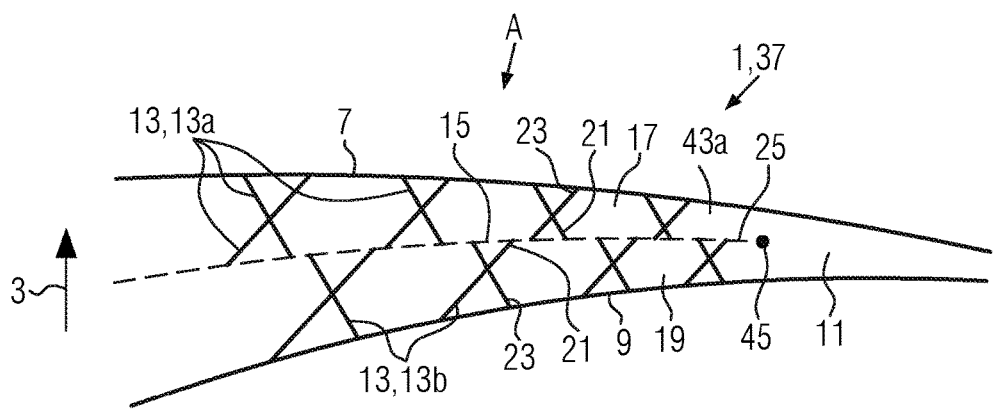
FIG. 4 a detailed view of the wing root, configured as a sandwich structure, of the aircraft or airplane from FIG. 3.

In FIGS. 3 and 4 an exemplary embodiment of an aircraft or airplane 33 according to the disclosure herein is shown, that comprises a sandwich structure 1 similar to that of FIG. 1; hence corresponding features are designated with the same reference signs.

As illustrated in FIG. 3, the aircraft or airplane 33 comprises a fuselage 35 and a wing 37. The wing 37 extends between a wing tip 39 pointing or facing away from the fuselage 35 and a wing root 41 opposite the wing tip 39. The wing 37 is secured to the fuselage 35 at the wing root 41. The wing 37 is formed as a shell structure 43 with a top or upper shell part 43a and a bottom or lower shell part 43b. As can be discerned from the section illustrated in FIG. 4, the top shell part 43a is configured in the area of the wing root 41 as a sandwich structure 1 similar to that of FIG. 1. The sandwich structure 1 comprises an outer cover layer 7, an inner cover layer 9, and a core layer 11 provided between the cover layers 7, 9. The sandwich structure 1 further comprises an anchor layer 15 running or extending between the outer and the inner cover layers 7, 9 in the area of the core layer 11, which anchor layer 15 divides the core layer 11 in the area of the wing root 41 into an outer core layer section 17 in abutment with the outer cover layer 7 and an inner core layer section 19 in abutment with the inner cover layer 9. The sandwich structure 1 further comprises a plurality of pins 13, of which an outer group 13a extends through the outer core layer section 17 and an inner group 13b extends through the inner core layer section 19. The pins 13 of the outer group 13a are fixed in the anchor layer 15 with their first end 21 and in the outer cover layer 7 with their second end 23, and the pins 13 of the inner group 13b are fixed in the anchor layer 15 with their first end 21 and in the inner cover layer 9 with their second end 23.

In this manner, it is possible to reinforce the core layers 11 of the shell structure 43 with a thickness as great as about 180 mm at the wing root 41 with pins 13, without the pins 13 exceeding a length of 90 mm. As can be discerned in FIG. 4, the spacing or distance between the outer and inner cover layers 7, 9 decreases from the wing root 41 towards the wing tip 39, so that at a location 45 at which the spacing or distance between the outer and inner cover layers 7, 9 is about 90 mm or less, an anchor layer 15 is no longer needed for establishing a pin connection between the two cover layers 7, 9 without having to use pins 13 longer than about 90 mm. Starting from the wing root 41, the anchor layer 15 thus extends towards the wing tip 39 at least as far as a location 45 (but not beyond this location 45 in the present exemplary embodiment) at which the spacing or distance between the outer and inner cover layers 7, 9 is 90 mm.

While at least one exemplary embodiment of the present invention(s) herein is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A sandwich structure comprising:
an outer cover layer;
an inner cover layer disposed opposite the outer cover layer in a thickness direction;
a core layer, which, as viewed in the thickness direction, is disposed between the outer and the inner cover layers and connects them; and
a plurality of pins including at least an outer group of pins and an inner group of pins, which extend between the outer and the inner cover layers, through the core layer;
an anchor layer between the outer and the inner cover layers, the anchor layer extending transversely to the thickness direction and dividing the core layer, at least in areas, into an outer core layer section in abutment with the outer cover layer and an inner core layer section in abutment with the inner cover layer;
the outer group of pins extending through the outer core layer section and the inner group of pins extending through the inner core layer section; and
the pins of the outer group being connected to the anchor layer with their first end and to the outer cover layer with their opposite second end, and the pins of the inner group being connected to the anchor layer with their first end and to the inner cover layer with their opposite second end, wherein the anchor layer comprises an outer anchor layer part pointing to the outer cover layer and an inner anchor layer part pointing to the inner cover layer, wherein the outer and inner anchor layer parts run transversely to the thickness direction, wherein between the outer and inner anchor layer parts, the core layer has a middle core layer section through which a middle group of pins extends, wherein the outer group of pins are connected to the outer anchor layer part with their first end and to the outer cover layer with their opposite second end, wherein the inner group of pins are connected to the inner anchor layer section with their first end and to the inner cover layer with their opposite second end, and wherein the middle group of pins are connected to the outer anchor layer part with their first end and to the inner anchor layer part with their opposite second end.

2. The sandwich structure according to claim 1, wherein the outer and the inner cover layers, the anchor layer, and the pins are formed monolithically by co-curing with each other from a fiber composite material.

3. The sandwich structure according to claim 1, wherein at a layer border, the anchor layer is cured monolithically together with the outer and/or the inner cover layer(s).

4. The sandwich structure according to claim 3, wherein the sandwich structure has a peripheral area at which the cover layers are cured monolithically with one another, wherein at the peripheral area of the sandwich structure, the anchor layer is joined with its layer border to the outer and inner cover layers.

5. An aircraft comprising a fuselage and a wing, wherein the wing extends between a wing tip pointing away from the fuselage and a wing root opposite the wing tip, with which wing root the wing is fastened to the fuselage, wherein the wing is formed as a shell structure with an upper shell part and a lower shell part, and wherein the upper shell part and/or the lower shell part comprise a sandwich structure in an area of the wing root, the sandwich structure comprising:

an outer cover layer;

an inner cover layer disposed opposite the outer cover layer in a thickness direction;

a core layer, which, as viewed in the thickness direction, is disposed between the outer and the inner cover layers and connects them; and a plurality of pins including at least an outer group of pins and an inner group of pins, which extend between the outer and the inner cover layers, through the core layer;

an anchor layer between the outer and the inner cover layers, the anchor layer extending transversely to the thickness direction and dividing the core layer, at least in areas, into an outer core layer section in abutment with the outer cover layer and an inner core layer section in abutment with the inner cover layer;

the outer group of pins extending through the outer core layer section and the inner group of pins extending through the inner core layer section; and the pins of the outer group being connected to the anchor layer with their first end and to the outer cover layer with their opposite second end, and the pins of the inner group being connected to the anchor layer with their first end and to the inner cover layer with their opposite second end, wherein spacing between the outer and inner cover layers decreases from the wing root towards the wing tip, and wherein starting from the wing root, the anchor layer extends towards the wing tip at least as far as a location at which the spacing between the outer and inner cover layers is between 30 mm and 200 mm.

* * * * *